(12) United States Patent
Zhuo

(10) Patent No.: US 12,012,080 B2
(45) Date of Patent: Jun. 18, 2024

(54) CHASSIS FOAM SPRAYER

(71) Applicant: Ningbo Yinzhou Kelingmei Machinery Manufacturing Co., Ltd., Ningbo (CN)

(72) Inventor: Xuming Zhuo, Ningbo (CN)

(*) Notice: Subject to any disclaimer, the term of this patent is extended or adjusted under 35 U.S.C. 154(b) by 0 days.

(21) Appl. No.: 17/857,076

(22) Filed: Jul. 4, 2022

(65) Prior Publication Data

US 2024/0001891 A1    Jan. 4, 2024

(51) Int. Cl.
*B60S 3/04*    (2006.01)

(52) U.S. Cl.
CPC ..................... *B60S 3/044* (2013.01)

(58) Field of Classification Search
CPC ................................. B60S 3/00–066
See application file for complete search history.

(56) References Cited

U.S. PATENT DOCUMENTS

| | | | | |
|---|---|---|---|---|
| 3,907,370 A * | 9/1975 | Bard | ............ | B60B 5/02 |
| | | | | 301/64.707 |
| 4,580,726 A * | 4/1986 | Unger | ............ | B60S 3/044 |
| | | | | 239/722 |
| 4,984,746 A * | 1/1991 | Joyal | ............ | B60S 3/042 |
| | | | | 239/722 |
| 6,131,831 A * | 10/2000 | Lawrence | ............ | B60S 3/044 |
| | | | | 239/722 |
| 2007/0007371 A1 * | 1/2007 | Mutz | ............ | B05B 9/007 |
| | | | | 239/530 |
| 2007/0169796 A1 * | 7/2007 | Johnson | ............ | B08B 3/026 |
| | | | | 134/123 |
| 2018/0037198 A1 * | 2/2018 | Hisch | ............ | B60S 3/044 |

FOREIGN PATENT DOCUMENTS

| | | | | |
|---|---|---|---|---|
| WO | WO-0170548 A1 * | 9/2001 | ............ | B08B 3/026 |
| WO | WO-2013010594 A1 * | 1/2013 | ............ | B05B 15/065 |
| WO | WO-2016029258 A1 * | 3/2016 | ............ | B05B 1/044 |

* cited by examiner

*Primary Examiner* — Spencer E. Bell
(74) *Attorney, Agent, or Firm* — Hawaii Patent Services; Nathaniel K. Fedde; Kenton N. Fedde

(57) ABSTRACT

A chassis foam sprayer comprises a bottom plate, a solvent pot and a flushing pipe arranged above the bottom plate, rollers arranged below the bottom plate, and an upper cover covering above the bottom plate, wherein one end of the flushing pipe is provided with a water inlet connector which can be externally connected with a high-pressure water gun, the other end of the flushing pipe is provided with at least one nozzle, and a connecting pipe is arranged between the solvent pot and the flushing pipe; the high-pressure water gun is fixedly connected with the water inlet connector by arranging the rollers on the bottom plate, and then the foam sprayer is pushed in at the position of the chassis of the automobile, so that the position can be conveniently moved, and all positions of the chassis can be conveniently cleaned; moreover, the solvent pot is equipped with car wash liquid, so that the chassis can be subjected to foam spraying first, and then washed with clean water for thorough cleaning.

5 Claims, 6 Drawing Sheets

CHASSIS FOAM SPRAYER

TECHNICAL FIELD

The present invention relates to a chassis foam sprayer.

BACKGROUND

With the improvement of productivity, cars are available to thousands of households and become one of the necessary means of transportation for our daily travel. During the driving process of the car, dust and other sundries will adhere to the surface of the car body and chassis, which will not only affect the appearance for a long time, but also may cause a certain degree of corrosion to the paint surface of the car and the external devices of the chassis. The existing household high-pressure washing machine or general washing service of automobile beauty shops only washes the car body, and the chassis position is basically ignored by people because it is not easy to be exposed; there are also large-scale equipment used for chassis cleaning in the market, but the equipment occupies a large area, and the car needs to be driven to a specific place to wash the car chassis, which has strong limitations and cannot be popularized and used in families.

SUMMARY

In view of the shortcomings of the above problems, the present invention provides a chassis foam sprayer.

In order to achieve the above purpose, the present invention provides a chassis foam sprayer, which includes a bottom plate, a solvent pot and a flushing pipe arranged above the bottom plate, rollers arranged below the bottom plate, and an upper cover covering the bottom plate; wherein one end of the flushing pipe is provided with a water inlet connector which can be externally connected with a high-pressure water gun, the other end of the flushing pipe is provided with at least one nozzle, and a connecting pipe is arranged between the solvent pot and the flushing pipe.

The roller is arranged on the bottom plate, and after the high-pressure water gun is fixedly connected with the water inlet connector, the foam sprayer is pushed into the chassis of the automobile, so that the position can be conveniently moved, and all positions of the chassis can be conveniently cleaned; moreover, the solvent pot is equipped with car wash liquid, so that the chassis can be subjected to foam spraying first, and then washed with clean water for thorough cleaning.

As a further improvement of the solution, a spout of the solvent pot extends out of the upper cover, and the spout is provided with a screw cover.

In the above technical solution, the upper cover hides the solvent pot, the washing pipe and the connecting pipe, which makes the sprayer beautiful and has the function of avoiding bumping, and the solvent pot can be replenished with car washing liquid in time by unscrewing the screw cover.

As a further improvement of the solution, the upper cover and the bottom plate form a detachable connection structure by a screw or a buckle.

In the technical solution, the detachable connection structure is convenient for disassembly, repair and maintenance.

As a further improvement of the solution, two ends of the bottom plate are provided with integrally formed hollow axles, on which hooks and contraction joints are formed, and the roller is sleeved on the axle and locked by a ring sleeve.

In the technical solution, the structural strength is guaranteed by the integrated molding mode, and rapid installation is realized by the locking mode of the ring sleeve.

As a further improvement of the solution, the connecting pipe is made of a hose, and a notch is formed in the middle of the solvent pot to facilitate the laying of the connecting pipe.

In the technical solution, the material of a hose is selected, which is convenient for installation, and the watertightness of the joint part can be effectively guaranteed, and the notch is convenient for positioning and installing the connecting pipe.

As a further improvement of the solution, the middle of the front end of the upper cover is symmetrically provided with two limiting plates, and the limiting plates are close to the sides of the notch.

In the technical solution, the position of the flushing pipe is limited by the limiting plates, and the position of the connecting pipe is limited by one limiting plate and the side of the notch, so that the structure is compact.

Compared with the prior art, the foam sprayer has the beneficial effects that the roller is arranged on the bottom plate, the high-pressure water gun is fixedly connected with the water inlet connector, and then the foam sprayer is pushed into the chassis position of the automobile, so that the position can be conveniently moved, and all positions of the chassis can be conveniently cleaned; moreover, the solvent pot is provided, and the solvent pot is internally provided with car wash liquid, so that the chassis can be sprayed with foam at first, and then washed with clean water for a second time, so that the foam sprayer can be thoroughly cleaned.

Figure 1:
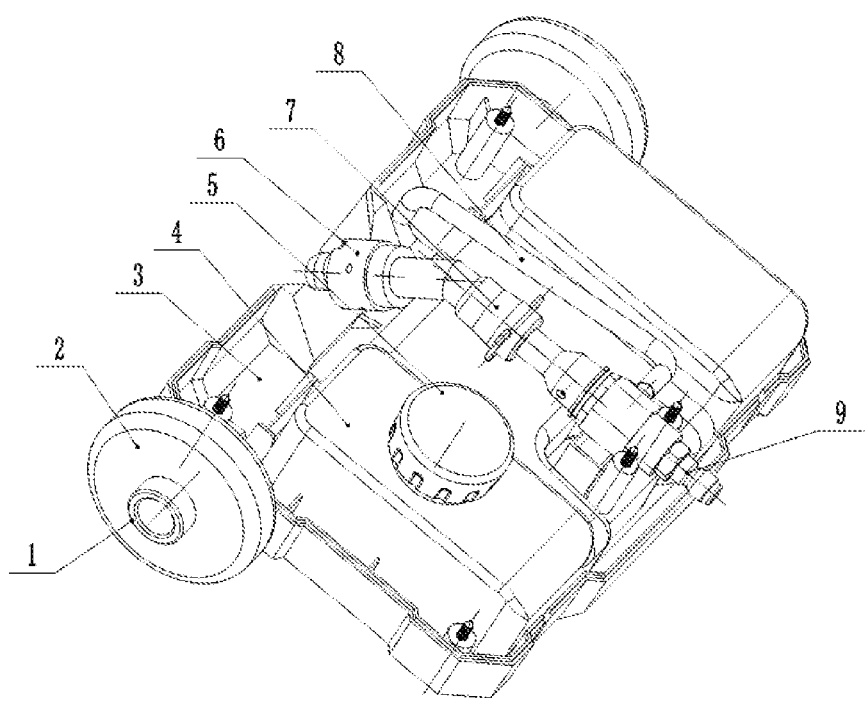
FIG. 1 is a perspective view of a chassis foam sprayer.

In the drawings: 1. Ring sleeve; 2. Roller; 3. Bottom plate; 31. Axle; 11. Hook; 12. Shrinkage joint; 4. Solvent pot; 41. Notch; 5. Screw cover; 6. Nozzle; 7. Flushing pipe; 8. Connecting pipe; 9. Water inlet connector; 10. Upper cover; 11. Limiting plate.

DESCRIPTION OF EMBODIMENTS

Figure 2:
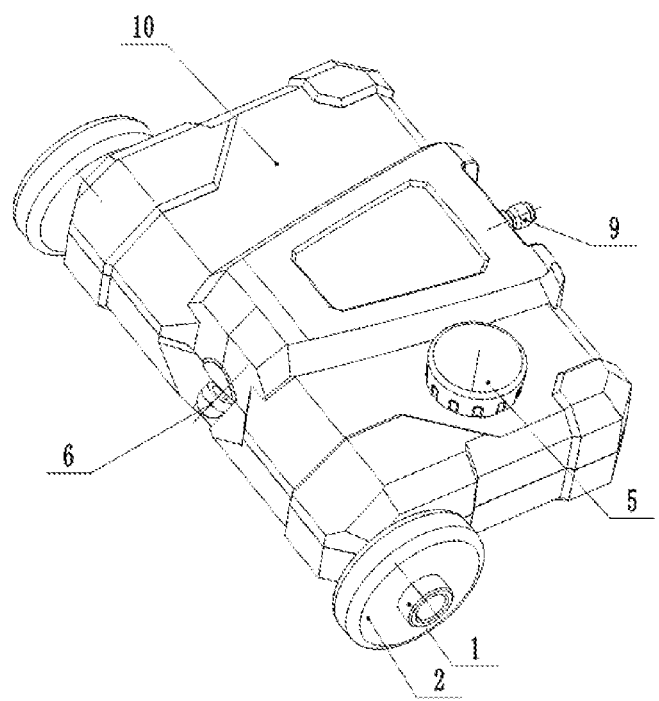
FIG. 2 is a perspective view of a chassis foam sprayer (equipped with an upper cover)
Figure 3:
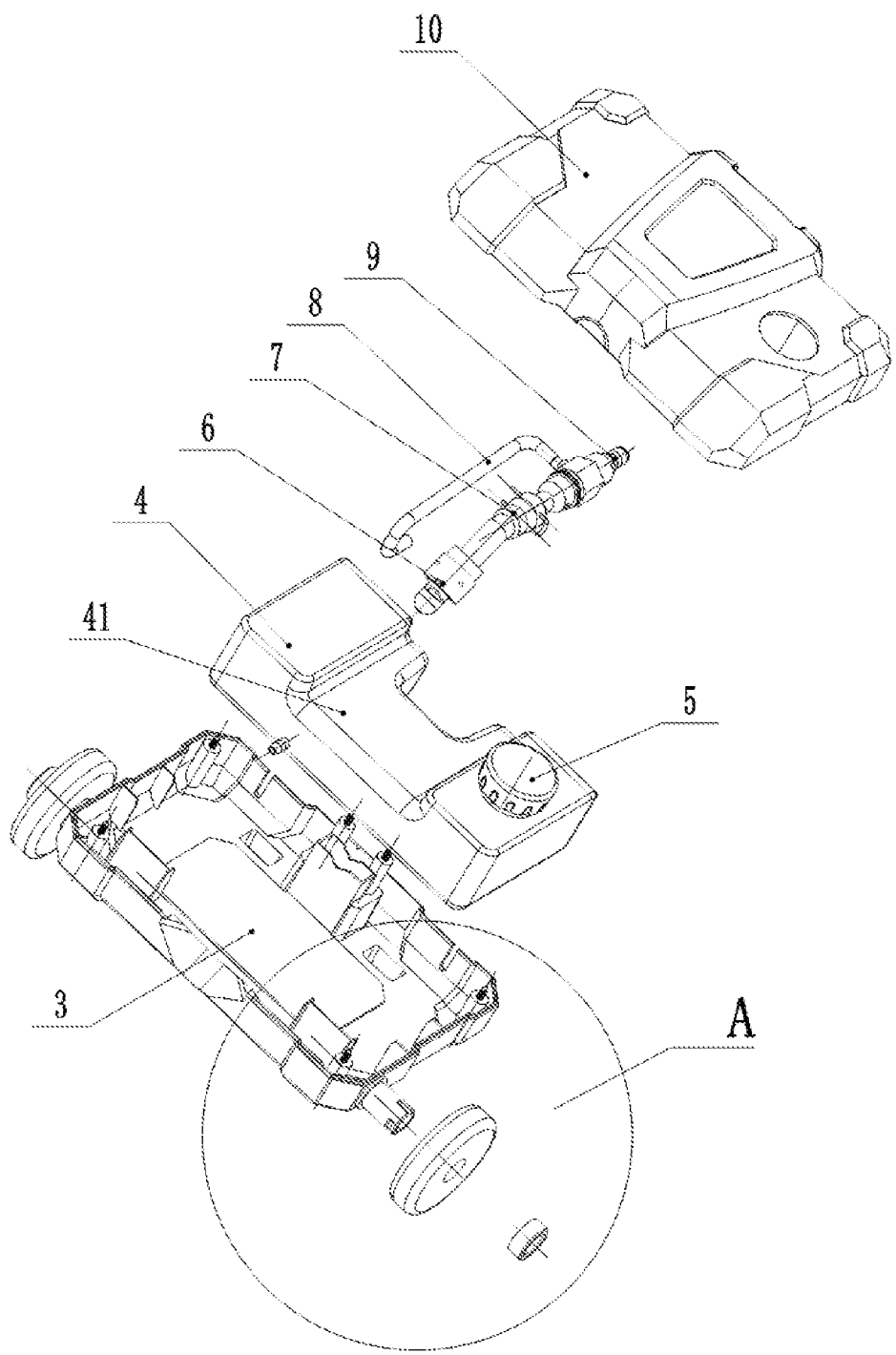
FIG. 3 is an exploded view of the chassis foam sprayer of FIG. 2.
Figure 4:
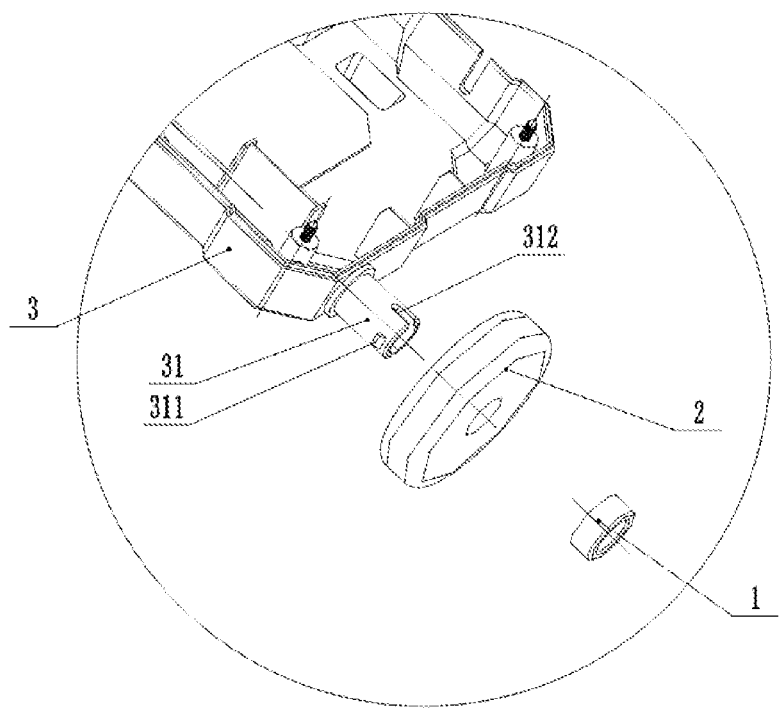
FIG. 4 is an enlarged view of position a in FIG. 3.
Figure 5:
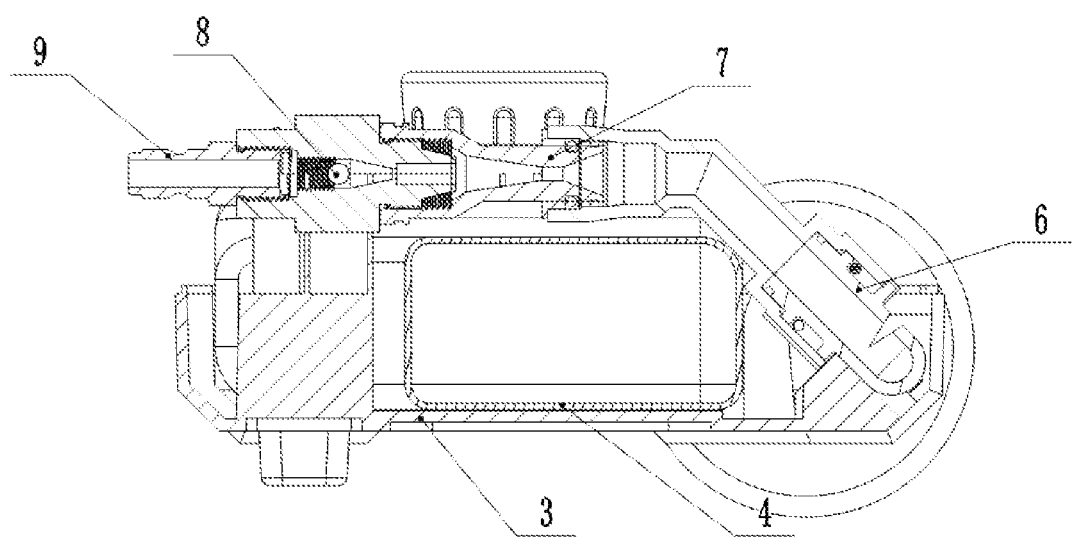
FIG. 5 is a sectional view of a chassis foam sprayer of FIG. 1.
Figure 6:
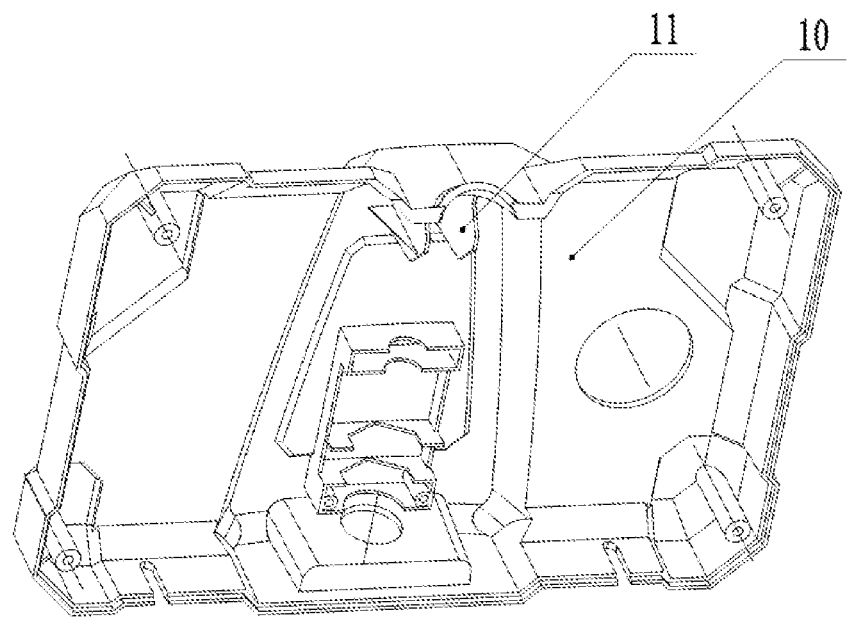
FIG. 6 is a perspective view of the upper cover.

As shown in FIGS. 1-6, a chassis foam sprayer according to the embodiment of the present invention a chassis foam sprayer, which includes a bottom plate 3, a solvent pot 4 and a flushing pipe 7 arranged above the bottom plate 3, rollers 2 arranged below the bottom plate 3, and an upper cover 10 covering the bottom plate 3; wherein one end of the flushing pipe 7 is provided with a water inlet connector 9 which can be externally connected with a high-pressure water gun, the other end of the flushing pipe 7 is provided with at least one nozzle 6, and a connecting pipe 8 is arranged between the solvent pot 4 and the flushing pipe 7; wherein a spout of the solvent pot 4 extends out of the upper cover 10, and the spout is provided with a screw cover 5; the upper cover hides the solvent pot, the washing pipe and the connecting pipe, which makes the sprayer beautiful and has the function of avoiding bumping, and the solvent pot can be replenished with car washing liquid in time by unscrewing the screw cover; the upper cover 10 and the bottom plate 3 form a detachable connection structure by a screw or a buckle; the detachable connection structure is convenient for disassembly, repair and maintenance; two ends of the bottom plate 3 are provided with integrally formed hollow axles 31, on which hooks 311 and contraction joints 312 are formed, and the roller 2 is sleeved on the axle 31 and locked by a ring sleeve 1; the structural strength is guaranteed by the integrated molding mode, and rapid installation is realized by the locking mode of the ring sleeve; the connecting pipe 8 is made of a hose, and a notch 41 is formed in the middle of the solvent pot 4 to facilitate the laying of the connecting pipe; the material of a hose is selected, which is convenient for installation, and the watertightness of the joint part can be effectively guaranteed, and the notch is convenient for positioning and installing the connecting pipe; the middle of the front end of the upper cover 10 is symmetrically provided with two limiting plates 11, and the limiting plates 11 are close to the sides of the notch 41; the position of the flushing pipe is limited by the limiting plates, and the position of the connecting pipe is limited by one limiting plate and the side of the notch, so that the structure is compact.

The roller is arranged on the bottom plate, and after the high-pressure water gun is fixedly connected with the water inlet connector, the foam sprayer is pushed into the chassis of the automobile, so that the position can be conveniently moved, and all positions of the chassis can be conveniently cleaned; moreover, the solvent pot is equipped with car wash liquid, so that the chassis can be sprayed with foam first, and then washed with clean water for thorough cleaning.

When in use, in order to facilitate the understanding of the present invention, it will be described with reference to the attached drawings.

When in use, the solvent pot and the flushing pipe are kept in communication with each other through the connecting pipe, and the water inlet connector is directly connected with the high-pressure water gun. The foam sprayer is pushed into the chassis position, and the gun head position of the high-pressure water gun is controlled to open. Water flows through the flushing pipe and the car wash liquid carrying the solvent pot is sprayed at the nozzle to form foam. During the spraying process, the position of the foam sprayer is properly moved so that the spraying effect covers the whole automobile chassis. After that, the spraying is carried out again after impurities such as dust and the chassis are dissolved for a period of time. When used for the second time, it is necessary to unscrew the screw cover first and replenish the car wash liquid into the solvent pot in time.

The above is only the preferred embodiment of the present invention, and it is not intended to limit the present invention. For those skilled in the art, the present invention can be modified and varied. Any modification, equivalent substitution, improvement and the like made within the spirit and principle of the present invention shall be included in the scope of protection of the present invention.

What is claimed is:

1. A chassis foam sprayer, comprising a bottom plate, a solvent pot and a flushing pipe arranged above the bottom plate, rollers arranged below the bottom plate, and an upper cover covering the bottom plate; wherein one end of the flushing pipe is provided with a water inlet connector which can be externally connected with a high-pressure water gun, another end of the flushing pipe is provided with at least one nozzle, and a connecting pipe is arranged between the solvent pot and the flushing pipe, wherein the connecting pipe is made of a hose, and a notch is formed in the middle of the solvent pot to facilitate laying of the connecting pipe.

2. The chassis foam sprayer according to claim 1, wherein a spout of the solvent pot extends out of the upper cover, and the spout is provided with a screw cover.

3. The chassis foam sprayer according to claim 1, wherein the upper cover and the bottom plate form a detachable connection structure by a screw or a buckle.

4. The chassis foam sprayer according to claim 1, wherein two ends of the bottom plate are provided with integrally formed hollow axles, on which hooks and contraction joints are formed, and the rollers are sleeved on respective axles of the integrally formed hollow axles and locked by respective ring sleeves.

5. The chassis foam sprayer according to claim 1, wherein the middle of a front end of the upper cover is symmetrically provided with two limiting plates, and the limiting plates are positioned relative to the sides of the notch such that the position of the flushing pipe is limited by the limiting plates and the position of the connecting pipe is limited by one of the limiting plates and a side of the notch.

\* \* \* \* \*